(12) United States Patent
Ben-Harrush et al.

(10) Patent No.: US 9,372,602 B2
(45) Date of Patent: Jun. 21, 2016

(54) PASSWORD PRESENTATION MANAGEMENT

(71) Applicant: International Business Machines Corporation, Armonk, NY (US)

(72) Inventors: Idan Ben-Harrush, Givat Elah (IL); Nili Guy, Kiriat Ata (IL); Samuel Kallner, Tal Menashe (IL); Ariel Landau, Nesher (IL); Yoav Rubin, Haifa (IL); Gal Shachor, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/668,272

(22) Filed: Nov. 4, 2012

(65) Prior Publication Data

US 2014/0129974 A1     May 8, 2014

(51) Int. Cl.
*G06F 3/0484*    (2013.01)
*G06F 3/0488*    (2013.01)
*G06F 21/31*     (2013.01)

(52) U.S. Cl.
CPC ............ *G06F 3/0484* (2013.01); *G06F 3/0488* (2013.01); *G06F 21/31* (2013.01)

(58) Field of Classification Search
CPC ..... G06F 3/0488; G06F 3/0416; G06F 21/31; G06F 21/36; G06F 2203/04808; G06F 3/017; G06F 2221/2123; H04L 63/083
See application file for complete search history.

(56) References Cited

U.S. PATENT DOCUMENTS

| | | | |
|---|---|---|---|
| 6,747,676 B2 | 6/2004 | Botz et al. | |
| 2002/0070964 A1* | 6/2002 | Botz et al. | 345/741 |
| 2011/0163971 A1* | 7/2011 | Wagner et al. | 345/173 |
| 2011/0296356 A1 | 12/2011 | Chaudhri et al. | |
| 2013/0246970 A1* | 9/2013 | Helle | 715/822 |

* cited by examiner

*Primary Examiner* — Jennifer To
*Assistant Examiner* — Terri Filosi

(57) ABSTRACT

According to some embodiments of the present invention, there is provided a method for revealing at least a portion of a disguised password on a display device. The method comprises receiving a plurality of password characters typed by a user, presenting a plurality of replacement symbols in a password field displayed by a display device of a terminal having a touch surface, each the replacement symbol being indicative of the reception of another of the plurality of password characters, detecting a fingertip which slides contiguously against the touch surface, and temporarily replacing the presentation of at least some of the plurality of replacement symbols with of the presentation of at least some of the plurality of password characters in a sequential manner correspondingly with a movement of the fingertip.

19 Claims, 3 Drawing Sheets

PASSWORD PRESENTATION MANAGEMENT

BACKGROUND

The present invention, in some embodiments thereof, relates to a method and a system for password entering and, more specifically, but not exclusively, to a password entering.

Computers, applications, and networks are often protected by passwords. In order to gain access to a computing system, an application, or a network system, an authorized user must enter a password. The computing system, the application, or network system authenticates the password by comparing the password entered by the user with a preset password. If the entered password matches the preset password, the user is given access. If the entered password does not match the preset password, the user is denied access.

However, the entered password may be presented or gained by an unauthorized person when the user enters the password. The unauthorized person may break into the computing system or the application or the network system using the presented password, to steal and/or corrupt data, and damage websites.

In order to reduce the chances the entered password is presented or gained by an unauthorized person, password characters of the entered password are not presented and replacement symbols are used to indicate that the password characters have been entered by the user.

In some cases passwords are simply about the reassuring appearance of security. A site that has password protection is, to many users, secure. When password masking is eliminated users save a few seconds irritation, the credibility of the protected service (i.e. software, data, and/or website) is reduced.

SUMMARY

According to some embodiments of the present invention there is provided a method for revealing at least a portion of a disguised password on a display device. The method comprises receiving a plurality of password characters typed by a user, presenting a plurality of replacement symbols in a password field displayed by a display device of a terminal having a touch surface, each the replacement symbol being indicative of the reception of another of the plurality of password characters, detecting a fingertip which slides contiguously against the touch surface, and temporarily replacing the presentation of at least some of the plurality of replacement symbols with of the presentation of at least some of the plurality of password characters in a sequential manner correspondingly with a movement of the fingertip.

Optionally, the method further comprises automatically replacing the presentation of the at least some password characters with of the presentation of the at least some replacement symbols.

Optionally, the detecting comprises detecting a movement vector of the fingertip and the temporarily replacing is preformed correspondingly with the movement vector.

Optionally, the plurality of password characters are typed by the user.

Optionally, the plurality of replacement symbols are temporarily replaced for a period of less than 2 seconds.

Optionally, the plurality of replacement symbols are temporarily replaced for a user configured period.

Optionally, each the replacement symbol is temporarily replaced with a respective the password character as long as the fingertip is detected above or in proximity to a presentation area thereof on the display device.

Optionally, the detecting comprises detecting a plurality of movement vectors of a plurality of fingertips which slide contiguously and simultaneously against the touch surface, the temporarily replacing is performed correspondingly with the plurality of movement vectors.

Optionally, the password field is presented on a graphical user interface (GUI) displayed by the display device.

More optionally, the GUI is presented by a browser running on the terminal.

More optionally, the GUI is presented by a module installed on the terminal.

Optionally, the plurality of replacement symbols are a plurality of segments which seamlessly emulate a continuous virtual object that is displayed on the display device.

Optionally, the detecting comprises detecting a set of sequential touch events of the fingertip.

According to some embodiments of the present invention there is provided a terminal having a touch surface for temporarily revealing a disguised password. The terminal comprises a processor, a display which presents a password field, a touch surface which receives a plurality of password characters typed by a user and operative to detect a movement of a fingertip which slides contiguously against the touch surface, and a password disguising module which presents a plurality of replacement symbols, using the processor, in the password field each the replacement symbol being indicative of the reception of another of the plurality of password characters. The password disguising module temporarily replaces the presentation of at least some of the plurality of password characters with of the presentation of at least some of the plurality of replacement symbols in a sequential manner correspondingly with the movement.

Optionally, the password disguising module automatically replaces the presentation of the at least some password characters with of the presentation of the at least some replacement symbols.

Optionally, the password disguising module instructs the positioning of a cursor displayed on the display according to the last location at which the fingertip has been detected by the touch screen.

More optionally, the password disguising module instructs a selection of at least one of the plurality of password characters according to the last location at which the fingertip has been detected by the touch screen.

According to some embodiments of the present invention there is provided a method for revealing at least a portion of a disguised password on a display device. The method comprises receiving a plurality of password characters typed by a user, presenting a plurality of replacement symbols in a password field displayed by a display device of a terminal, each the replacement symbol being indicative of the reception of another of the plurality of password characters, detecting a movement of a cursor object which slides contiguously along the password field, and temporarily replacing the presentation of at least some of the plurality of replacement symbols with of the presentation of at least some of the plurality of password characters in a sequential manner correspondingly with the movement.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
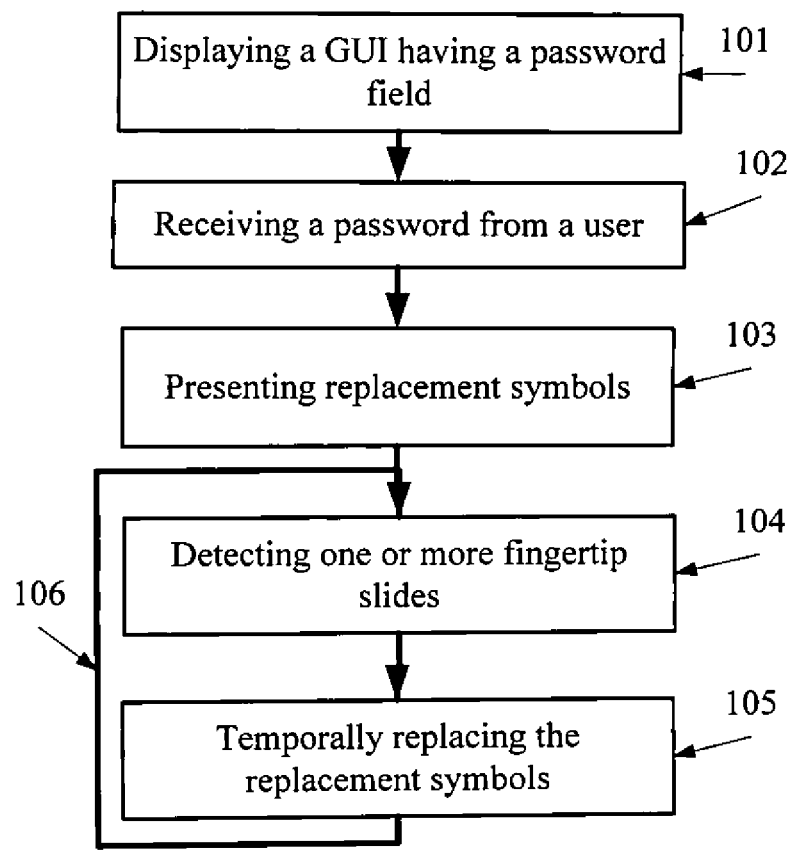
FIG. 1 is a flowchart of a method for revealing at least a portion of a disguised password that is presented on a touch screen display of a client terminal, according to some embodiments of the present invention.

The present invention, in some embodiments thereof, relates to a method and a system for password entering and, more specifically, but not exclusively, to a password entering.

According to some embodiments of the present invention, there are provided methods and systems of temporarily revealing at least a portion of a disguised password that is presented on a display device in response to the detection of a movement of one or more fingertips which slide contiguously against a touch surface, optionally in proximity to the area at which the portion of the disguised password is presented. The methods and systems allow a user to indicate by a slide, also known as a swipe, which inputted characters of the password are presented and re-concealed and/or in which order. By doing so the user may control the rate at which password characters are presented and re-concealed. It should be noted that though this description focuses on fingertip slides against a password field presented on a touch screen display, other controlled indicators may be slide against a password field in a similar manner. For example, a cursor object may be maneuvered to slide along the password field by an eye tracking mechanism and/or by a brain-machine interface.

Optionally, the location at which the continuous movement of the fingertip ends is used to select which one of the password characters to present and optionally to edit, to replace, and/or to delete.

The temporal presentation of password characters, which are represented by replacement symbols, as enabled by the methods and systems of the present invention, overcome disadvantages of password masking on devices, such as mobile devices. These methods and systems allow the user to verify the correctness of the inputted password characters without submitting the password and/or exposing the password to unauthorized persons. It should be noted that the need to remove the disadvantages of password masking is so essential that some users prefer not masking their password at all at the risk of reducing the security of their data and/or access to essential services.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a method for revealing at least a portion of a disguised password that is presented on a touch screen display of a client terminal, according to some embodiments of the present invention. As used herein, a client terminal may be a laptop, a tablet, a Smartphone, a desktop, and/or any computing device that is connected to a screen display, such a touch screen display.

Figure 2:
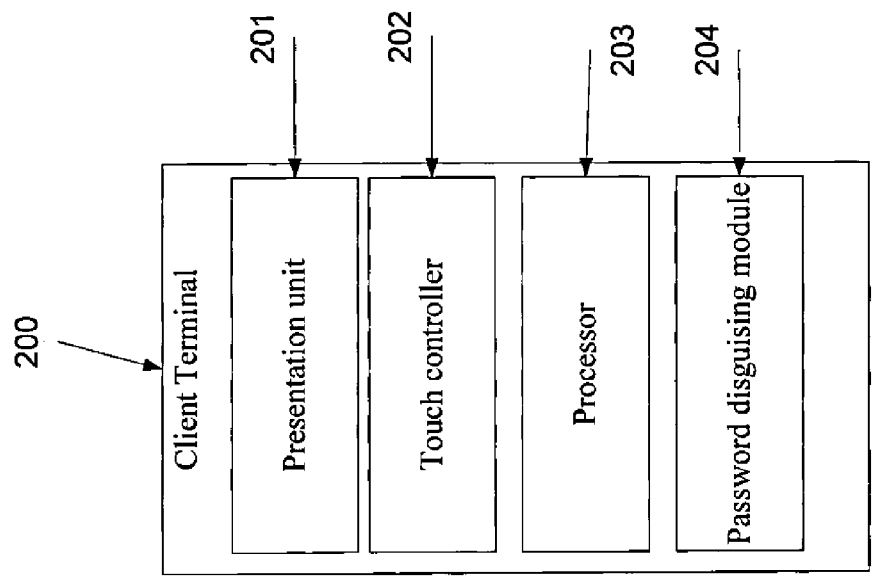
FIG. 2 is a schematic illustration of components of a client terminal having a touch screen display, according to some embodiments of the present invention.

Reference is also made to FIG. 2, which is a schematic illustration of components of a client terminal 200 having a presentation unit 201, such as a touch screen display, an augment reality display, and/or a smart glasses display set to display a password field, a touch controller 202 and a processor 203, according to some embodiments of the present invention. The touch controller 202 optionally includes one or more application program interfaces (APIs) which monitor touch events so that touch events occurring above, in proximity, and/or in association with a character in the password field are detected.

The client terminal 200 further includes a password disguising module 204 which optionally instructs how to reveal password characters of a disguised password in a manner that does not substantially expose the disguised password itself to an unauthorized person, for example as described below. The password disguising module 204 may be part of an operating system, an add-on, a plug-in, a hardware component, a software component, such as a presale software component, an application installed an downloaded from an app store and/or android market, and/or the like.

Figure 3:
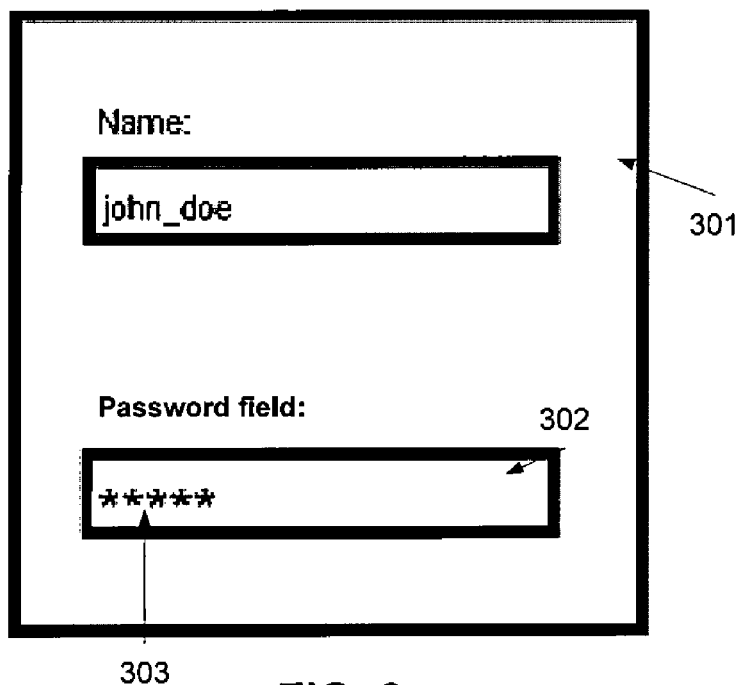
FIG. 3 is a graphical user interface having a password field.

First, as shown at 101, for example as depicted in FIG. 3, a graphical user interface (GUI) 301 having a password field 302 is displayed to a user for example on the presentation unit 201. The GUI may be part of an interface of a software executed on the client terminal 200, for example an application, a GUI that includes a password field and is presented by a browser, for example a GUI of a certain website, a GUI that includes a password field of an operating system, and/or any GUI that is accessed using the client terminal 200. Optionally, the temporal presentation period is user defined.

Now, as shown at 102 and optionally as commonly known in the art, password characters representing a password are received from a user, optionally entered, for example typed, by the user. For example, the user uses a keyboard, a keypad, and/or stroke inputting GUI displayed on the presentation unit 201 and/or a keyboard, a keypad and/or any character selection device that is connected to the client terminal 200 for typing the password characters.

Now, as shown at 103, a plurality of replacement symbols, such as asterisks, optionally as depicted by numeral 303 of FIG. 3, letters, such as X, dots, characters of a fake password and/or the like are presented in the password field 302. Each replacement symbol is indicative of the reception of another of the password characters received, for example typed at 102. Optionally, the replacement symbols are segments which seamlessly emulate a continuous virtual object wherein the addition of a segment is indicative of an addition of password character.

Now, as shown at 104, one or more movement vectors of one or more fingertips which slide contiguously against the presentation unit 201 are detected, for example by the touch controller 202 connected to the presentation unit 201. For example, each movement vector is induced by a fingertip which slides contiguously against an area of the presentation unit 201 along which some or all of the replacement symbols are presented and/or along a proximate area below and/or above the area in which the replacement symbols are presented. The motion vector may be detected as a combination of a set of sequential touch events and/or as a motion vector event.

It should be noted, as outlined above, that though this description focuses on fingertip slides against a password field presented on a touch screen display, other controlled indicators may be slid against a password field in a similar manner. For example, a cursor object may be maneuvered to slide along the password field by an eye tracking mechanism and/or by a brain-machine interface. Therefore, as used herein, a fingertip which slides against a touch screen and a cursor object led along a presentation may be referred to herein interchangeably. In response to the detection, as shown at 105, the presentation of some or all of the replacement symbols, which are presented in the password field, are temporarily replaced with the presentation of some or all of the password characters in a sequential manner correspondingly with the one movement vector(s). After the temporal presentation, one or more temporally presented password characters may be replaced with the replacement symbols before the password is submitted. This process may be repeated any number of times.

Figures 4A, 4B, 4C:
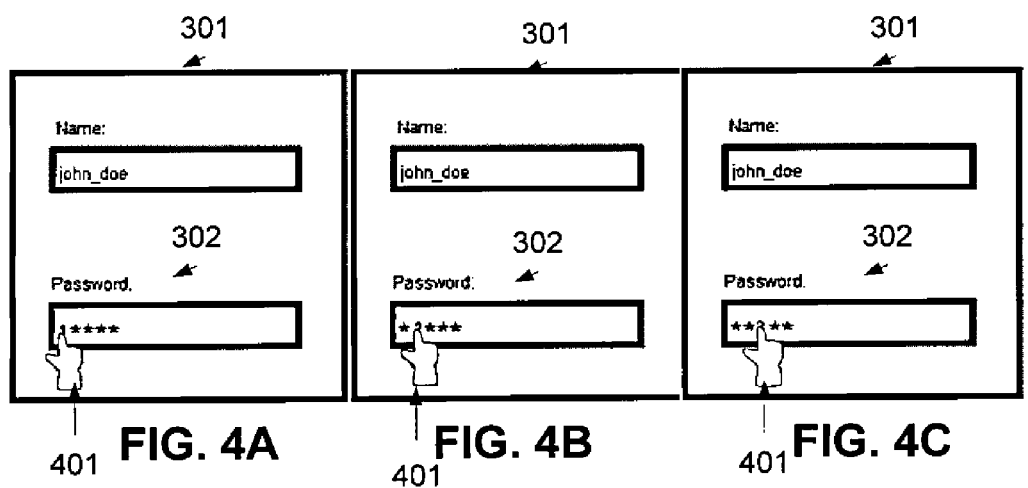
FIGS. 4A-4C are schematic illustrations of the graphical user interface of FIG. 3 in different intervals of a period which corresponds with the detection of a motion vector of a fingertip that slides along and above an area of the touch screen display that displays a password field, according to some embodiments of the present invention.

As used herein, a temporal presentation means a presentation of less than one second, 3 seconds, 10 seconds, 30 seconds and/or any intermediate period. Optionally, the temporal presentation lasts only when the fingertip of the user is above and/or in proximity of the certain password character. For example, FIGS. 4A-4C are schematic illustrations of the GUI 301 depicted in FIG. 3 in different intervals of a period which corresponds with the detection of a motion vector of a fingertip 401 that slides along and above an area of the presentation unit 201 that displays the password field 302, according to some embodiments of the present invention. Optionally, the revealed password character is magnified in relation to the size of the replacement symbols during the temporal presentation.

Optionally, when a user maneuvers two fingertips along the presentation unit 201, for instance one fingertip against the other and/or one fingertip following the other, two motion vectors are detected simultaneously and different groups of the replacement symbols which are presented in the password field are temporarily replaced with the presentation of some or all of the password characters in a sequential manner, each correspondingly with another of the movement vectors.

The temporal presentation of the password characters allows the user to verify which password characters she already typed in a partial manner, for example sequentially. In such a manner, the user does not reveal other password characters to an unauthorized beholder. This results in a password entering user interaction which is not cumbersome and has improved security. Unlike a password entering procedure wherein password characters are all hidden and the user does not have the ability to reveal only some of the password characters; in this procedure the user can detect typos without having to expose all the characters and verify that the password is correct without any password submission. Consequently, no failure to login is caused and the user is not required to re-fill the password field. It should be noted that this solution has an added value when implemented on mobile client terminals with a touch screen display as these devices have small touch area and the mistyping rate is relatively high in relation to a physical keyboard of client terminals.

Optionally, the position of a cursor that is displayed on the presentation unit 201, for example a text typing cursor, a navigation cursor and/or the like, is set according to the sliding fingertip. For example, the position of the cursor may be set at pixels and/or in proximity to the pixels below the last area in which the fingertip was detected and according to which the movement vector was calculated. In such a manner, when the user reveals an error in inputting a certain password character, she can raise her finger, delete the certain password character, and type a new password character instead. Additionally or alternatively, the password character, which is temporally presented, may be automatically selected for editing, for example for deletion and/or replacement, in response to the raising of the sliding fingertip. The selected password character may remain as is if the user does not enter a new password character or replaced if the user does not enter a new password character.

As shown at 106, 104 and 105 may be repeated iteratively, allowing the user to represent the characters a number of times, until she is sure that the entered password is correct. After the user verified that the password is correct she submits it, for example as known in the art.

Optionally, temporal revealing of password characters is activated upon a user selection and/or preference, for example by making a selection in a GUI website with a password field, making a selection in browser preferences, making a selection in an application preferences and/or the like.

It should be noted that the above may be implemented on a terminal which do not use a touch screen. In these embodiments, touch events are events in which a cursor object is placed to select replacement symbols and a slide is a movement of a cursor object along at least a portion of the replacement symbols.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a display, a touch screen, a touch screen display is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for revealing at least a portion of a disguised password on a display device, comprising:

receiving a plurality of password characters typed by a user into a touch surface of a touch based display device;

presenting a plurality of replacement symbols in a password field displayed by a touch based display device of a terminal having a touch surface, each said replacement symbol being indicative of the reception of another of said plurality of password characters;

detecting two movement vectors of two fingertips which slide contiguously and simultaneously against said touch surface maneuvered such that one of said two fingertips is following the other, below or above an area wherein said plurality of replacement symbols are presented; and temporarily replacing at least some of said plurality of replacement symbols in said password field with the presentation of at least some of said plurality of password characters correspondingly with said two movement vectors such that said at least some replacement symbols are temporarily replaced correspondingly with a location of said two fingertips below or above said presentation of said plurality of replacement symbols to allow said user to verify said plurality of password characters correspondingly with a simultaneous movement of said two fingertips, wherein said at least some of said plurality of password characters are presented in different groups which are presented simultaneously in said password field, each one of said different groups is presented correspondingly with another of said two movement vectors.

2. The method of claim 1, further comprising automatically replacing the presentation of said at least some password characters with the presentation of said at least some replacement symbols.

3. The method of claim 1, wherein said plurality of password characters are typed by said user.

4. The method of claim 1, wherein said plurality of replacement symbols are temporarily replaced for a period of less than 2 seconds.

5. The method of claim 1, wherein said plurality of replacement symbols are temporarily replaced for a user configured period.

6. The method of claim 1, wherein each said replacement symbol is temporarily replaced with a respective said password character as long as said plurality of fingertips are detected above or in proximity to a presentation area thereof on said display device.

7. The method of claim 1, wherein said password field is presented on a graphical user interface (GUI) displayed by said display device.

8. The method of claim 7, wherein said GUI is presented by a browser running on said terminal.

9. The method of claim 7, wherein said GUI is presented by a module installed on said terminal.

10. The method of claim 1, wherein said plurality of replacement symbols are a plurality of segments which seamlessly emulate a continuous virtual object that is displayed on said display device.

11. The method of claim 1, wherein said detecting comprises detecting a set of sequential touch events of said of two fingertips.

12. The method of claim 1, wherein said at least some of said plurality of password characters which are replaced in a sequential manner correspondingly with said movement of said plurality of fingertips are magnified in relation to the size of the plurality of replacement symbols during the temporal presentation of said at least some of said plurality of password characters.

13. The method of claim 1, wherein said temporarily replacing at least some of said plurality of replacement symbols is activated upon a user selection.

14. A computer program product for revealing at least a portion of a disguised password on a display device, comprising:

a non transitory computer readable storage medium;

first program instructions to display on a display device a graphical user interface (GUI) having a password field;

second program instructions to present a plurality of replacement symbols in said password field each said replacement symbol being indicative the reception of another of a plurality of password characters;

third program instructions to detect two movement vectors of two fingertips which slide contiguously and simultaneously against a touch surface of said display device, maneuvered such that one of said two fingertips is following the other, below or above area wherein said plurality of replacement symbols are presented;

fourth program instructions to temporarily replace the presentation of at least some of said plurality of replacement symbols in said password field with the presentation of at least some of said plurality of password characters correspondingly with said two movement vectors such that said at least some replacement symbols are temporarily replaced correspondingly with a location of said two fingertips below or above said presentation of said plurality of replacement symbols, wherein said at least some of said plurality of password characters are presented in different groups which are presented simultaneously in said password field, each one of said different groups is presented correspondingly with another of said two movement vectors; and fifth program instructions to replace automatically the presentation of said at least some password characters with the presentation of said at least some replacement symbols;

wherein said first, second, third, fourth and fifth program instructions are stored on said computer readable storage medium.

15. A terminal having a touch surface for temporarily revealing a disguised password, comprising:

a processor;

a display which presents a password field;

a touch surface which receives a plurality of password characters typed by a user and operative to detect two movement vectors from a simultaneous movement of two fingertips which slide contiguously and simultaneously against said touch surface, maneuvered such that one of said two fingertips is following the other; and a password disguising module which presents a plurality of replacement symbols, using said processor, in said password field each said replacement symbol being indicative of the reception of another of said plurality of password characters;

wherein said password disguising module temporarily replaces the presentation of at least some of said plurality of password characters with the presentation of at least some of said plurality of replacement symbols correspondingly with said simultaneous movement of said two fingertips;

wherein said two fingertips slide below or above area wherein said plurality of replacement symbols are presented;

wherein the presentation of said at least some replacement symbols is held such that said at least some replacement symbols are temporarily replaced correspondingly with a location of said two fingertips below or above said presentation of said plurality of replacement symbols, wherein said at least some of said plurality of password characters are presented in different groups which are presented simultaneously in said password field, each one of said different groups is presented correspondingly with another of said two movement vectors.

16. The terminal of claim 15, wherein said password disguising module automatically replaces the presentation of said at least some password characters with the presentation of said at least some replacement symbols.

17. The terminal of claim 15, wherein said password disguising module instructs the positioning of a cursor displayed on said display according to a last location at which said two fingertips have been detected by said touch screen.

18. The terminal of claim 15, wherein said password disguising module instructs a selection of at least one of said plurality of password characters according to a last location at which said two fingertips have been detected by said touch screen.

19. The terminal of claim 15, wherein said password distinguishing module temporarily replaces the presentation of at least some of said plurality of password characters dependently on an activation by a user selection.

* * * * *